(12) United States Patent
Germanetti

(10) Patent No.: US 6,246,341 B1
(45) Date of Patent: Jun. 12, 2001

(54) METHOD AND DEVICE FOR ASSISTANCE WITH THE MAINTENANCE OF AN AIRCRAFT, ESPECIALLY OF A HELICOPTER

(75) Inventor: Serge Alexandre Marc Germanetti, Marseille (FR)

(73) Assignee: Eurocopter, Marseille-Provence (FR)

(*) Notice: Subject to any disclaimer, the term of this patent is extended or adjusted under 35 U.S.C. 154(b) by 0 days.

(21) Appl. No.: 09/312,608

(22) Filed: May 17, 1999

(30) Foreign Application Priority Data

May 18, 1998 (FR) .................................................. 98-06226

(51) Int. Cl.⁷ .................................................. G08B 21/00
(52) U.S. Cl. .......................... 340/946; 340/945; 340/973; 701/14; 701/16; 701/35; 701/99
(58) Field of Search ..................... 340/945, 946, 340/973; 701/35, 123, 14, 99, 100, 16; 702/147; 714/704, 703; 707/104, 103, 29

(56) References Cited

U.S. PATENT DOCUMENTS

| | | | |
|---|---|---|---|
| 3,678,256 | * | 7/1972 | Harenberg, Jr. .......................... 701/16 |
| 4,621,335 | * | 11/1986 | Bluish et al. ......................... 340/945 |
| 4,635,030 | * | 1/1987 | Rauch .................................. 340/945 |
| 4,787,053 | * | 11/1988 | Moore .................................. 701/123 |
| 4,811,255 | * | 3/1989 | Kelly, III .............................. 702/147 |
| 4,845,495 | * | 7/1989 | Bollard et al. ........................ 340/973 |
| 4,984,239 | * | 1/1991 | Suzuki et al. .......................... 714/703 |
| 5,239,468 | * | 8/1993 | Sewersky et al. ....................... 701/35 |
| 5,475,594 | * | 12/1995 | Oder et al. ............................... 701/14 |
| 5,479,350 | * | 12/1995 | Barakchi et al. ...................... 701/100 |
| 5,552,987 | * | 9/1996 | Barger et al. ........................... 701/14 |
| 5,610,923 | * | 3/1997 | Callay .................................... 714/704 |
| 5,761,625 | * | 6/1998 | Honcik et al. .......................... 701/14 |
| 5,838,261 | * | 11/1998 | Lauta et al. ............................ 340/945 |

FOREIGN PATENT DOCUMENTS

| | | |
|---|---|---|
| 0407179A1 | 11/1991 | (EP) . |
| 0490805A1 | 6/1992 | (EP) . |

OTHER PUBLICATIONS

French Search Report dated Feb. 5, 1999.

J.A. Frenster, et al. "Improved Flightline Diagnostics Using An Expert Maintenance Tool (XMAN II)" Proceedings of the National Aerospace and Electronics Conference (NAECON), Dayton, May 21–25, 1990, vol. 3, May 21, 1990, pp. 1354–1357, XP000314501 Institute of Electrical and Electronics Engineers.

Klaus–P. Gartner, et al. "Human Engineering Evaluation Of A Cockpit Display/Input Device Using A Touch Screen" Agard Conference Proceedings No. 240, Oct. 17, 1997, pp. 7–1–7–13, XP002090775, Dayton, USA.

* cited by examiner

Primary Examiner—Benjamin C. Lee
(74) Attorney, Agent, or Firm—Stevens, Davis, Miller & Mosher, LLP

(57) ABSTRACT

The present invention relates to a method and a device (1) for assistance with the maintenance of an aircraft, especially of a helicopter, intended for replaying maintenance information.

According to the invention, data relating to the operation of the said aircraft are recorded, with a view to their being replayed in the form of maintenance information, these data being accessible to a monitoring and visual display system (2) of the said aircraft, and only data capable of being visually displayed by the said monitoring and visual display system (2) are recorded with a view to presenting them to at least one pilot of the said aircraft.

27 Claims, 3 Drawing Sheets

METHOD AND DEVICE FOR ASSISTANCE WITH THE MAINTENANCE OF AN AIRCRAFT, ESPECIALLY OF A HELICOPTER

BACKGROUND OF THE INVENTION

FIELD OF THE INVENTION

The present invention relates to a method and a device for assistance with the maintenance of an aircraft, particularly of a helicopter.

DESCRIPTION OF THE RELATED ART

Various devices are known for assistance with maintenance, particularly on helicopters. Generally, these devices are attached devices and are only intended to monitor particular elements of the said helicopter, such as its engine or engines, for example.

To that end, these known devices generally record data relating to the said elements to be monitored and process these data so as to form maintenance information which especially indicates any failure in one of the said elements, as the case may be, this maintenance information being able to be replayed to a maintenance operator at the end of a flight, so as to facilitate any maintenance operations which may have to be carried out.

However, these usual maintenance-assistance devices, and especially the known devices of the "Health and Usage Monitoring System" type (see the document EP-0 407 179, for example) exhibit many drawbacks. In particular, a defect or even a total failure of such devices may not be detected by the pilot, which is, needless to say, very inconvenient for maintenance.

Hence, in order to overcome this drawback, special-purpose verification means are generally provided for each of these known devices, in particular:

in order to check that the said device is actually connected; and in order to ensure that the said device is fully serviceable.

Such verification means are, needless to say, bulky and expensive.

SUMMARY OF THE INVENTION

The object of the present invention is to remedy these drawbacks. It relates to a method necessitating reduced size and cost for its implementation and providing assistance with maintenance which is both comprehensive and very effective.

To that end, according to the invention, the said method is noteworthy in that data relating to the operation of the said aircraft are recorded, with a view to their being replayed in the form of maintenance information, these data being accessible to a monitoring and visual display system of the said aircraft, and in that only data capable of being visually displayed by the said monitoring and visual display system are recorded with a view to presenting them to at least one pilot of the said aircraft.

Thus, since by virtue of the invention there is no longer any difference between the data recorded and those presented to the pilot, the latter is in a position personally and at any moment to verify the correct operation of the said maintenance-assistance method, which makes it possible to dispense with special-purpose verification means and thus to obtain a very effective method offering inexpensive and compact implementation.

Moreover, by reason of the link created with the said monitoring and visual display system of the aircraft, which is preferably a system which carries out comprehensive monitoring of the aircraft and which displays important information on the operation of the said aircraft on screens installed in the cockpit, overall monitoring of the aircraft is carried out by virtue of the invention, and not monitoring of particular elements of it as is the case for the above-mentioned known devices.

It will be noted moreover, in the context of the present invention, that replaying of maintenance information means visual display of the said information on a screen or printing on an appropriate medium (paper or diskette).

According to the invention, the said maintenance information preferably includes:

indications on failures of elements of the said aircraft. Elements of the said aircraft are understood to mean both parts or units of the said aircraft which are necessary for its operation, as well as components of the device intended for implementing the method in accordance with the invention and components of the said monitoring and visual display system;

characteristic values likely to facilitate the understanding and the repair of the said failures; and/or indications or proposals for repair of the said failures, either in the form of direct and precise proposals or in the form of a reference back to a maintenance manual.

Furthermore, advantageously, the following successive steps are carried out:

a) tests are performed for detecting failures;

b) when a failure is detected, all the data relating to the operation of the said aircraft and likely to be related to the said failure are recorded;

c) the said recorded data are processed so as to form maintenance information; and d) the said maintenance information is replayed.

At step a), at least one of the following tests is preferably carried out, consisting respectively:

in the case of a monitoring and visual display system comprising at least two monitoring suites, in verifying coherence between the information generated respectively by the said suites;

in verifying the validity of values of defined parameters; and in making comparisons between different values, for example values detected respectively by systems for monitoring the two engines of a twin-engined helicopter.

Moreover, in order to facilitate detection of a failure, according to the invention, at the above-mentioned step b):

after a failure has been detected and before data relating to the said failure are recorded, a characteristic signal is displayed indicating the existence of the failure, and the pilot is asked to take action with a view to recording the said data, which makes it possible to ensure that the pilot has taken due note of the existence of the said failure;

in the event of an intermittent failure being detected, the recurrence of the said failure and an indication as to its presence at the end of flight are recorded; and/or the values, before and after the detection of the failure, of at least one parameter characteristic of the said failure are recorded, and, at the above-mentioned step c), a comparison is carried out between the said values recorded in order to locate the said failure, which makes it possible to refine the fault locating.

Moreover, advantageously, at the said step c), in order to locate a failure;

coherence processing operations of known type are carried out; and/or account is taken of the probability of failure for a plurality of elements of the said aircraft and of the ease of replacing each of the said elements.

Moreover, in order to simplify the presentation of the information, for example in flight to a pilot or on the ground to a maintenance operator, the said maintenance information is advantageously grouped in such a way as to form pages of information.

Moreover, a menu page is preferably formed, indicating the various pages of information available and allowing an operator to select at least one of the said pages of information, at least in order to view it, but also, if necessary, to print it onto an appropriate medium (diskette, paper).

Furthermore, in order to facilitate maintenance based on monitoring of information over a plurality of different, preferably successive, flights, advantageously:

a set of at least j pages of information is formed, comprising information of the same type, for a number j of recent flights, j being an integer greater than or equal to 1; and an entry page is formed, indicating the various pages of information available of the said set of j pages of information, so as to select one of the said pages of information, at least in order to view it, and possibly to print it out on a medium.

In one particularly advantageous embodiment, at least one page of information is formed including at least:

information relating to failures of the aircraft;

information relating to limits exceeded;

information on a health check on at least one engine of the said aircraft;

information relating to times for implementing the said method and flight times of the said aircraft; and/or one of the last m flight reports, m being an integer greater than or equal to 1.

Preferably, each of the said m flight reports includes at least some of the following information:

the number of the flight;

the duration of the flight;

the number of cycles of the engine or engines;

the total number of cycles of the engine or engines;

the number of cycles of the free turbine;

the total number of cycles of the free turbine;

if appropriate, a message indicating the detection of a failure during the flight; and if appropriate, a message indicating the detection of limits exceeded.

The present invention also relates to a device for implementing the above-mentioned method.

According to the invention, the said device is noteworthy in that it includes:

means for detecting a failure;

means for recording data relating to the operation of the aircraft and likely to be related to the said failure;

means for forming maintenance information; and means for replaying the said maintenance information; as well as selection means.

The said maintenance-assistance device is preferably integrated, at least partially, into the said monitoring and visual display system, which facilitates implementation of the above-mentioned method and allows overall monitoring.

Moreover, such integration makes it possible to reduce the cost and the size of the said device.

Furthermore, the device in accordance with the invention includes at least one, but preferably several replaceable modules, which makes it possible to repair any failure of the said device rapidly by simply replacing the module which is at the origin of this failure.

Advantageously, moreover, the said device is produced at least partly in a dual architecture format.

Hence, the reliability and the safety of the device is considerably increased, since, in the event of a failure of a part of the said device, it can continue to operate by means of the corresponding part which has not failed.

The figures of the attached drawing will give a good understanding of how the invention can be produced. In these figures, identical references designate similar elements.

DETAILED DESCRIPTION OF THE PREFERRED EMBODIMENTS

Figure 1:
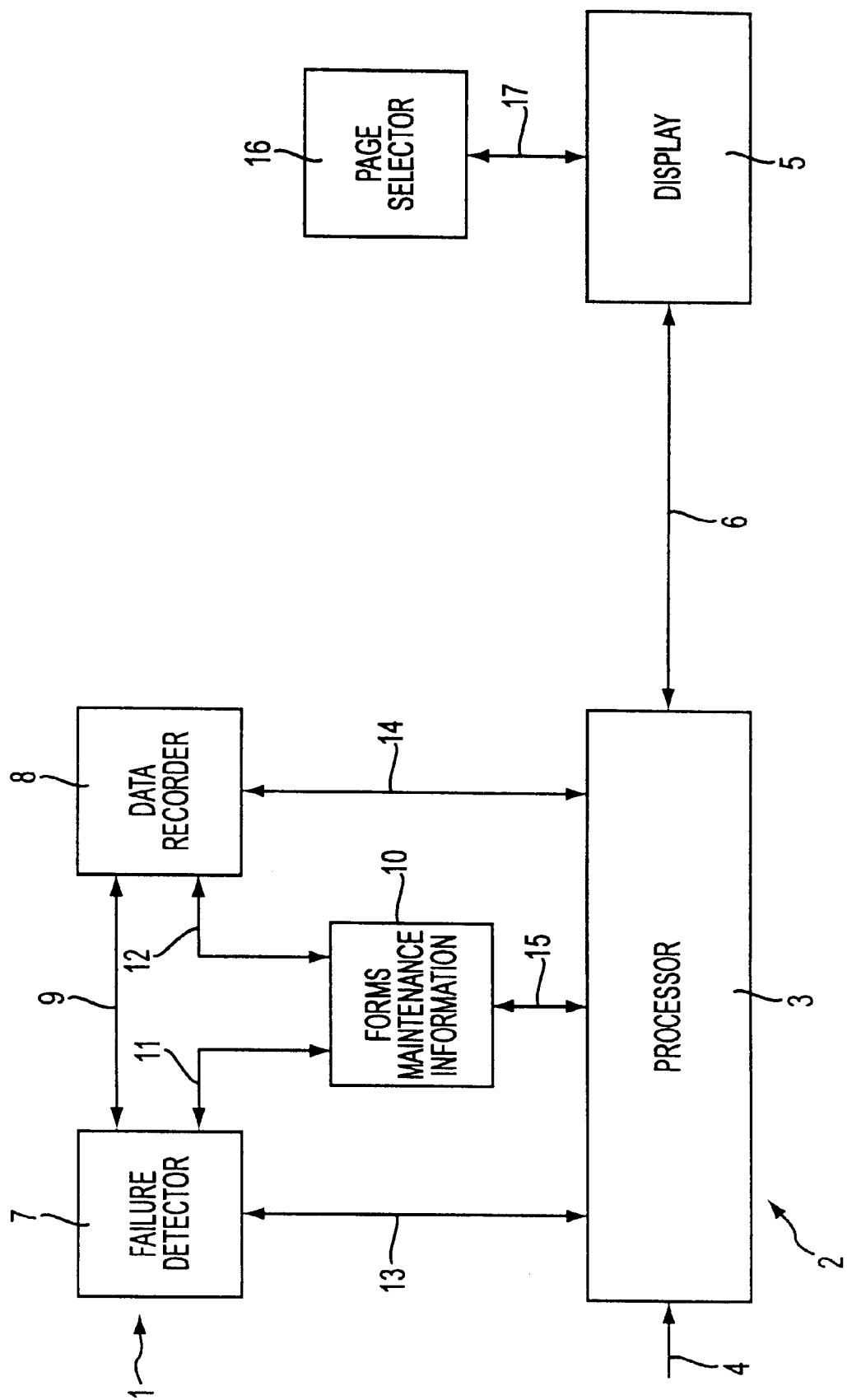
FIG. 1 is the block diagram of a device in accordance with the invention.

The device 1 for assistance with the maintenance of an aircraft, in this instance a helicopter, in accordance with the invention and represented diagrammatically in FIG. 1 is associated with a monitoring and visual display system 2 of the said helicopter.

The said monitoring and visual display system 2 is a system of known type, including:

data acquisition and processing means 3:

which receive data on the operation of the helicopter, such as values of parameters characteristic of the engine and/or of the main gearbox and/or information on the fuel or the outside temperature, for example, as represented in a general way by a link 4; and which process the said data so as to form flight information; and visual display means 5 linked by a link 6 to the said means 3 and capable of displaying the said flight information, and on at least one screen which is not represented, which is preferably equipped with a liquid-crystal matrix and which is installed in the helicopter cockpit.

According to the invention, the said maintenance-assistance device 1 includes:

means 7 capable of detecting a failure of a plurality of elements of the said helicopter, and particularly of the device 1 and of the system 2;

means 8 linked to the said means 7 by a link 9 and intended to record data which relate to the operation of the said helicopter and which are likely to be related to a failure detected by the means 7; and means 10 linked respectively by links 11 and 12 to the said means 7 and 8 and capable of forming maintenance information, from the said recorded data.

Moreover, in order to be able to carry out their respective functions, the said means 7, 8 and 10 are linked respectively by links 13 to 15 to the said means 3 of the monitoring and visual display system 2.

In the context of the present invention, the device 1 and especially the said means 7, 8 and 10 may simply be associated with and linked to the said system 2.

However, in one preferred embodiment, the said device 1 is integrated at least partly into the said system 2 (although it is not represented thus in FIG. 1 for reasons of simplicity of the drawing), which facilitates the implementation of the processing operations carried out by the said device 1 and reduces the cost and the size thereof.

Moreover, although not represented in the figures for reasons of clarity, according to the invention:

the device 1 and the system 2 are produced in a dual architecture format, in particular the system 2 includes two monitoring suites comprising the means 3 and 5 in each case, which makes it possible to increase the reliability considerably; and the device 1 and the system 2 are produced in the form of replaceable modules (for example one module per monitoring suite of the system 2), which, in the event of a failure of the device 1 or of the system 2, guarantees a rapid and inexpensive repair, since it is sufficient to replace the module at the origin of the failure, and since it is therefore not necessary to disturb the whole of the device 1 and of the system 2.

According to the invention, the said device 1 is intended for replaying, particularly to a maintenance operator at the end of a flight, maintenance information formed by the means 10 and particularly:

indications on failures of elements of the said helicopter;

characteristic values likely to facilitate the understanding and the repair of the said failures; and/or indications or proposals for repair of the said failures, either in the form of direct and precise proposals, or in the form of a reference back to a maintenance manual.

Replay is understood to mean the visual display of the said information on a screen and/or printing of it on an appropriate medium.

This replay is preferably implemented by using means 5 of the system 2, which avoids having to provide specific means.

Moreover, according to the invention, the means 8, with a view to their subsequent replay in the form of maintenance information, record only data capable of being presented to a pilot of the aircraft in the course of the flight, via the means 5.

Hence, in order to ensure that a member of the crew has actually seen important failure information, for example failure information comprising indications of a failure detected, according to the invention a characteristic signal indicating the existence of this failure is displayed on the screen of the means 5, and the pilot or a member of the crew is asked to take action with a view to the recording of the data relating to this failure.

Hence, no difference exists between the data recorded by the device 1 and used especially for maintenance and those presented to the crew.

The latter can therefore check the correct operation of the said device 1 easily and at any moment during the flight.

Consequently, unlike the known and above-mentioned devices, the device 1 in accordance with the invention needs no special-purpose monitoring facilities, which especially reduces its cost and its size.

According to the invention, in order to detect any failure, the said means 7 carry out a plurality of tests and in particular at least one of the following tests, consisting respectively:

in the case of a monitoring and visual display system 2 comprising at least two monitoring suites, in verifying coherence between the information generated respectively by the said suites;

in verifying the validity of values of defined parameters; and in making comparisons between different values, relating, for example, to the same parameter or relating to two engines in the case of a twin-engined helicopter.

Furthermore, in the event of an intermittent failure being detected, that is to say a failure which appears and disappears successively, the means 8 record the recurrence of the said failure and an indication as to its presence at the end of flight, so as to avoid seeking the solution to a problem which does not exist or no longer exists.

In one particularly advantageous embodiment, the said means 8 record the values, before and after the detection of the failure, of at least one parameter characteristic of the said failure and the said means 10 carry out a comparison between the said recorded values, in order to locate the said failure, which allows a very fine analysis and facilitates locating the failure.

In a variant or in supplement to the foregoing, the means 10 also carry out coherence processing in order to locate a failure. To do this, the said means 10 use at least one system of equations and verify coherence between them in order to determine whether one of the said equations is false and in order to deduce therefrom, if appropriate, the parameter which is false and which is at the origin of the failure.

In one supplementary embodiment, in order to locate a failure and particularly in order to suggest an element to be replaced, the said means 10 take account, on the one hand, of the probability of failure for a plurality of elements of the said aircraft, which have a direct or indirect relationship with the failure, and, on the other hand, of the ease of replacement of each of the said elements, which makes it possible to simplify and facilitate maintenance.

Moreover, with the same aim of making maintenance easier and simpler, the device 1 in accordance with the invention groups the maintenance information together, in connection with the system 2, into the information pages detailed below, so as to facilitate the understanding and the management of the said information, particularly for a maintenance operator.

Figure 2:
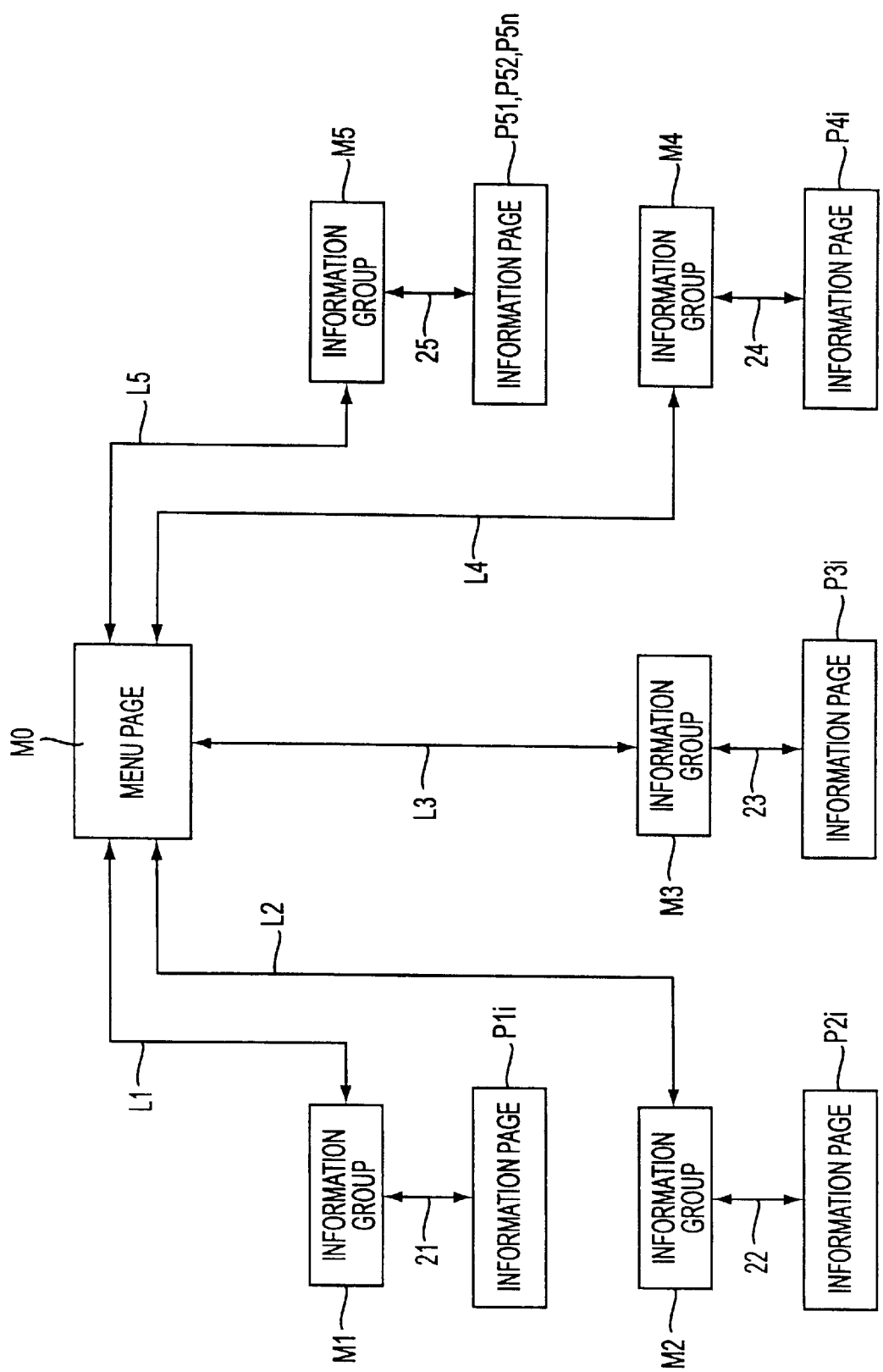
FIG. 2 diagrammatically illustrates the various functionality aspects which are accessible by the device in accordance with the invention.

The said pages of information can be viewed particularly on the screen of the means 5, as well as a menu page M0 indicating the functionalities or the various groups of information M1 to M5 which are accessible to an operator, as illustrated in FIG. 2 by the links L1 to L5 linking the menu page M0 to these groups M1 to M5. In order to gain access to the said functionalities, the device 1 includes means 16 linked to the said means 5 by a link 17 and allowing an operator to select one of them.

In one particular embodiment, the said means 16 are integrated into the said means 5.

According to the invention, an operator can thus gain access:

via the group M1 to at least one page of information P1i comprising at least one flight report, as illustrated by a link 21;

via the group M2 to at least one page of information P2i comprising at least information relating to failures of the helicopter, as illustrated by a link 22;

via the group M3 to at least one page of information P3i comprising at least information on a health check of at least one engine of the said helicopter, as illustrated by a link 23;

via the group M4 to at least one page of information P4i comprising at least information relating to operating times of the said device 1 and of the said system 2 and of the times of flight of the said helicopter, as illustrated by a link 24; and via the group M5 to at least one page of information P5i detailed below by reference to FIG. 3 and including information relating to limits exceeded, as illustrated by a link 25.

The indices i of the said pages P1i to P4i are variable and possibly different depending on the functionality M1 to M4 in question.

According to the invention, each of the said functionalities M1 to MS which can be viewed via an entry page may allow access to recorded information relating to a plurality of recent flights and, in the case of each of these various recent flights, several pages may exist for the same functionality, as will be seen in more detail below by reference to FIG. 3.

By way of example, the group M1 may, for example, include the last 32 reports on flights by the helicopter, which makes it possible to have an overview of the profile of any failures or operating defects.

Moreover, according to the invention, each of the said flight reports includes at least some of the following information:

the number of the flight;
the duration of the flight;
the number of cycles of the engine or engines;
the total number of cycles of the engine or engines;
the number of cycles of the free turbine;
the total number of cycles of the free turbine;
if appropriate, a message indicating the detection of a failure during the flight and, if appropriate, specifying a subsystem detected as having failed (automatic pilot, visual display, etc) which can be exchanged by an operator,
if appropriate, a message indicating the detection of limits exceeded.

Figure 3:
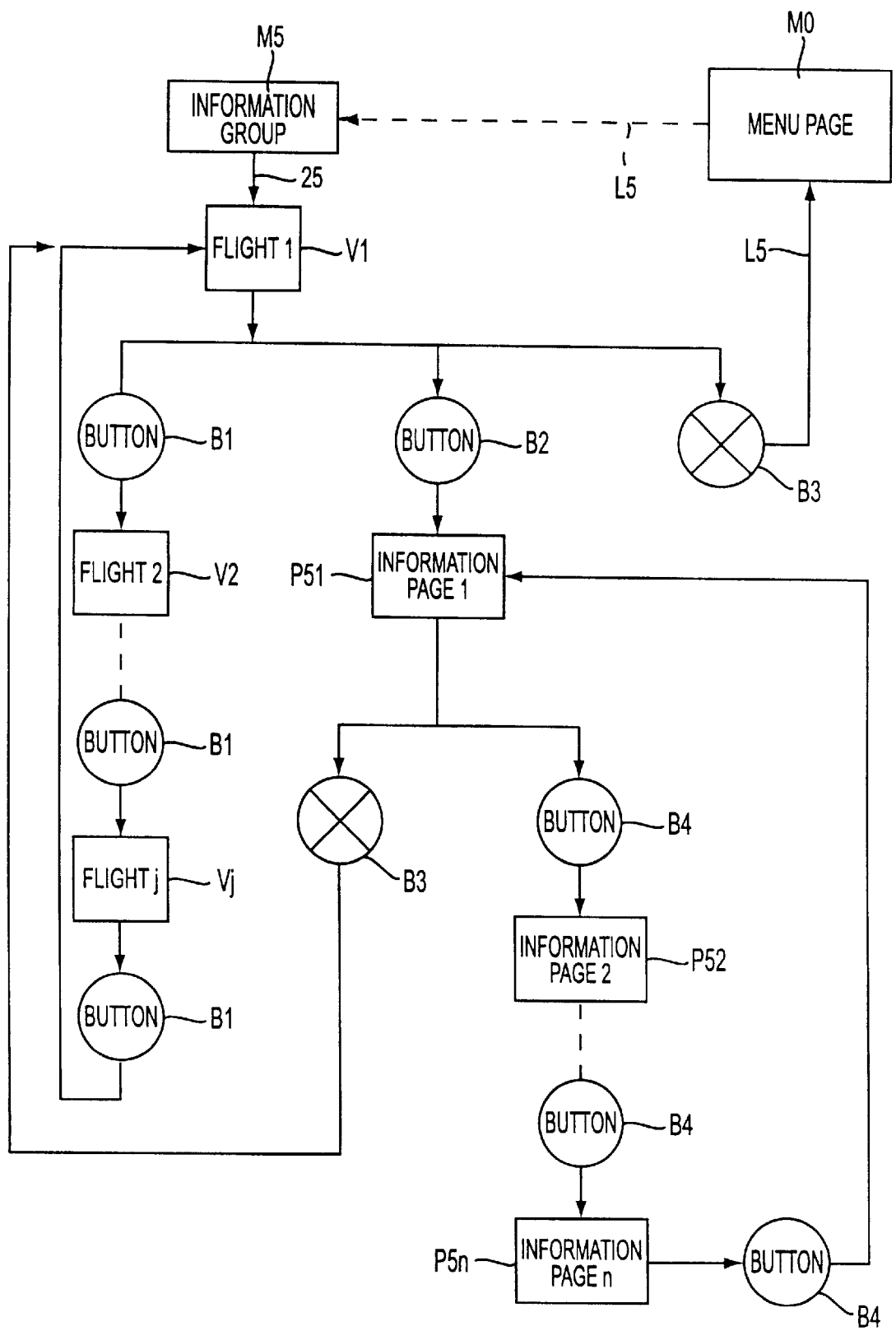
FIG. 3 diagrammatically illustrates an automatic unit for information presentation.

In FIG. 3 an automatic unit has been illustrated diagrammatically which is integrated into the means 16, allowing an operator to gain access, from the entry page MS, to the various pages of information relating to limits exceeded in the last j flights V1 to Vj, j being an integer greater than 1.

The characteristics in accordance with the invention and described below by reference to FIG. 3 can, needless to say, also be applied to the information groups M1 to M4.

From the entry page M5, access is gained to the first flight V1. From there, an operator can:

actuate a button 31 of the means 16, in order to gain access to the following flight V2, and so on up to the flight Vj, and finally again to the said flight V1; or actuate a button 32, in order to cause the first page P51 relating to the said first flight V1 to be displayed on the means 5; or actuate a button B3, in order to return to the menu page M0.

From the said first page P51, the operator can: either gain access to the following pages P52, . . . , PSn of the said first flight V1, and finally again to page P51, by actuating a button 34;

or come back to the said first flight V1, by actuating the said button B3, from any one of the said pages P51 to P5n.

The various selections in accordance with the invention are thus made cyclically so that an operator can gain access to all the information recorded.

Needless to say, in addition to being visually displayed, the various accessible information pages P51, P52, . . . , P5N can also be printed on an appropriate medium.

What is claimed is:

1. A method for assisting the maintenance of an aircraft having a monitoring and visual display system for comprehensively and globally monitoring the aircraft, said method comprising:

comprehensively and globally monitoring the aircraft;

recording data relating to operation of the aircraft with a view to replaying said data in the form of maintenance information, wherein the data are accessible to the aircraft's monitoring and visual display system, and wherein the only data that are recorded are data capable of being visually displayed by the monitoring and visual display system to at least one pilot of the aircraft in such a way that the pilot may personally and at any moment verify the data recorded; and visually displaying the data recorded to the pilot in the form of maintenance information.

2. The method as claimed in claim 1, wherein the said maintenance information includes indications, if appropriate, on failures of elements of the said aircraft.

3. The method as claimed in claim 2, wherein the said maintenance information moreover includes characteristic values likely to facilitate the understanding and the repair of the said failures.

4. The method as claimed in claim 2, wherein the said maintenance information moreover includes proposals for repair of the said failures.

5. The method as claimed in claim 1, wherein the following successive steps are carried out:

a) tests are performed for detecting failures;

b) when a failure is detected, all the data relating to the operation of the said aircraft and likely to be related to the said failure are recorded;

c) the said recorded data are processed so as to form maintenance information; and d) the said maintenance information is replayed.

6. The method as claimed in claim 5, wherein at step a) at least one of the following tests is carried out, consisting respectively:

in the case of a monitoring and visual display system comprising at least two monitoring suites, in verifying coherence between the information generated respectively by the said suites;

in verifying the validity of values of defined parameters; and in making comparisons between different values.

7. The method as claimed in claim 5, wherein at step b) after a failure has been detected and before data relating to the said failure are recorded, a characteristic signal is displayed indicating the existence of the failure, and the pilot is asked to take action with a view to recording the said data.

8. The method as claimed in claim 5, wherein in the event of an intermittent failure being detected, the recurrence of the said failure and an indication as to its presence at the end of flight are recorded at step b).

9. The method as claimed in claim 5, wherein the values, before and after the detection of the failure, of at least one parameter characteristic of the said failure are recorded at step b), and wherein, at step c), a comparison is carried out between the said values recorded in order to locate the said failure.

10. The method as claimed in claim 5, wherein at step c), in order to locate a failure, coherence processing operations are carried out.

11. The method as claimed in claim 5, wherein at step c), in order to locate a failure, account is taken of the probability of failure for a plurality of elements of the said aircraft and of the ease of replacing each of the said elements.

12. The method as claimed in claim 1, wherein the said maintenance information is grouped together so as to form pages of information.

13. The method as claimed in claim 12, wherein a menu page is formed, indicating the various pages of information available and allowing an operator to select at least one of the said pages of information, at least in order to view it.

14. The method as claimed in claim 12, wherein a set of at least j pages of information is formed, comprising information of the same type, for a number j of recent flights being an integer greater than or equal to 1.

15. The method as claimed in claim 14, wherein an entry page is formed, indicating the various pages of information available of the said set of j pages of information and allowing an operator to select one of the said pages of information, at least in order to view it.

16. The method as claimed in claim 12, wherein at least one information page is formed, including at least one of the last m flight reports, m being an integer greater than or equal to 1.

17. The method as claimed in claim 16, wherein the said flight report includes at least some of the following information:

the number of the flight;
the duration of the flight;
the number of cycles of the engine or engines;
the total number of cycles of the engine or engines;
the number of cycles of the free turbine;
the total number of cycles of the free turbine;

if appropriate, a message indicating the detection of a failure during the flight and, if appropriate, giving details of a sub-system detected to have failed; and if appropriate, a message indicating the detection of limits exceeded.

18. The method as claimed in claim 12, wherein at least one page of information is formed including at least information relating to failures of the aircraft.

19. The method as claimed in claim 12, wherein at least one page of information is formed including at least information relating to limits exceeded.

20. The method as claimed in claim 12, wherein at least one page of information is formed including at least information on a health check of at least one engine of the said aircraft.

21. The method as claimed in claim 12, wherein at least one page of information is formed including at least information relating to times for implementing the said method and flight times of the said aircraft.

22. A device for implementing the method specified under claim 1, which includes:

means for detecting a failure;

means for recording data relating to the operation of the aircraft and likely to be related to the said failure;

means for forming maintenance information; and means for replaying the said maintenance information.

23. The device as claimed in claim 22, which moreover includes selection means.

24. The device as claimed in claim 22, which is integrated, at least partially, into the said monitoring and visual display system (2).

25. The device as claimed in claim 22, which includes at least one replaceable module.

26. The device as claimed in claim 22, which is produced, at least partly, in a dual architecture format.

27. The method of claim 1, wherein the aircraft is a helicopter.

* * * * *